United States Patent

Long

Patent Number: 6,002,408
Date of Patent: Dec. 14, 1999

[54] BLEND CONTROL SYSTEM

[75] Inventor: Timothy Merrick Long, Lindfield, Australia

[73] Assignees: Canon Information Systems Research Australia Pty Ltd, New South Wales, Australia; Canon Kabushiki Kaisha, Tokyo, Japan

[21] Appl. No.: 08/663,926

[22] Filed: Jun. 14, 1996

[30] Foreign Application Priority Data

Jun. 16, 1995 [AU] Australia ............... PN3602

[51] Int. Cl.⁶ .................................. G06T 17/00
[52] U.S. Cl. .................................... 345/431
[58] Field of Search ............... 345/418, 430, 345/431, 427, 443, 444

[56] References Cited

U.S. PATENT DOCUMENTS

| | | | |
|---|---|---|---|
| 5,467,443 | 11/1995 | Johnson et al. | 395/141 |
| 5,487,020 | 1/1996 | Long | 364/571.01 |
| 5,586,232 | 12/1996 | Yoshida | 345/427 |
| 5,611,036 | 3/1997 | Berend et al. | 345/441 |
| 5,682,505 | 10/1997 | Usami et al. | 345/418 |
| 5,854,633 | 12/1998 | Cooper et al. | 345/431 |

FOREIGN PATENT DOCUMENTS 0 455 351  11/1991  European Pat. Off. .

OTHER PUBLICATIONS

James Foley, et al., Computer Graphics: Principles and Practice, Addison–Wesley Publishing Company, Inc., pp. 92–94 and 979–982 (1990).

*Primary Examiner*—Phu K. Nguyen
*Assistant Examiner*—Cliff N. Vo
*Attorney, Agent, or Firm*—Fitzpatrick, Cella, Harper & Scinto

[57] ABSTRACT

A method and apparatus for determining color blend of a computer graphical object involves providing a plurality of interactive control points, with each of the control points having an associated color value; and calculating a color value of each portion of the object depending on its relative position to the control points. Preferably, the number of control points is two. Preferably, the position or associated color value of each of the control points can be interactively altered and the method further comprises the step of recalculating the color values of each portion of the object when the control points are altered. Preferably, the portions of the object having a projection outside a line taken between the two control points are determined to have a color substantially the same as the closest one of the control points (5,6).

31 Claims, 6 Drawing Sheets

BLEND CONTROL SYSTEM

FIELD OF THE INVENTION

The present invention generally relates to the field of computer graphics and, in particular, to a system for the accurate control of a color blend from a first color to a second color in a computer-generated image.

BACKGROUND

In a recent years, as computers have become ever more powerful, there has been a proliferation of software application packages for designing and creating complex full-color images that can be subsequently printed out using color printing devices. The quality of such images created readily achieves, or surpasses, that capable of being achieved even with photographic images. Consequently, an industry has developed around the creation of such images employing a large number of graphic artists and the like whose occupation is to create complex and appealing images for general public consumption.

The complex images created by software application packages (such as Adobe's Photoshop and Illustrator (Trade Marks), Quark's Express (Trade Mark) and other packages of the same ilk) generally consist of a large number of substantially independent objects which are often independently created by the graphic artist. One attribute sometimes found in such software application packages is the ability to create blends between a first color and second color and to apply the blend to any of the objects.

By way of example, a circle 1 is shown in FIG. 1 which is a simple object from which other more complex objects can be made up. This object 1 has a predefined blend from a first dark color 2 to a second lighter color 3.

Although such blends are known in software application packages such as the ones mentioned above, such conventional software application packages disadvantageously do not allow for the manipulation of a blend. For example, they do not enable a fine alternation of a blend to a slightly different color.

SUMMARY OF THE INVENTION

It is an object of the present invention to provide a system which allows for the simple creation of blends and their fine manipulation.

In accordance with a first aspect of the invention, there is provided a method of determining a color blend of a computer graphical object. The method comprises providing a plurality of interactive control points, where each of the control points has an associated color value, and calculating a color value of each portion of the graphical object dependent on its relative position to the control points.

Preferably, the number of the control points is two. Further, portions of the graphical object that have a projection outside a line taken between the two control points can be determined to have a color substantially the same as the closest one of the control points. Optionally, the position, or associated color value, or both, of each of the control points can be interactively altered. Still further, the method can also comprise the step of recalculating the color values of each portion of the graphical object when the control points are altered.

Optionally, the color blend comprises an opacity blend where each of the control points has an associated opacity value.

In accordance with a second aspect of the invention, there is provided an apparatus for determining a color blend of a computer graphical object. The apparatus comprises means for providing a plurality of interactive control points, where each of the control points has an associated color value, and means for calculating a color value of each portion of the graphical object dependent on its relative position to the control points.

Preferably, the number of the control points is two. The apparatus can further comprise means for determining the color of portions of the graphical object having a projection outside a line extending between the two control points whereby the color of each portion is assigned to be substantially the same as that of the closest one of the control points. Optionally, the position, or associated color value, or both, of each of the control points can be interactively altered. Still further, the apparatus can comprise means for recalculating the color values of each portion of the graphical object when the control points are altered.

Optionally, the color blend comprises an opacity blend where each of the control points has an associated opacity value.

In accordance with a third aspect of the invention, there is provided a method for controlling a color blend of a graphical object. The graphical object is displayed as part of a computer-generated image on display means. The image comprises a first predetermined number of pixels and is stored in memory coupled to a processing means. The graphical object has a second predetermined number of pixels less than or equal to the first predetermined number of pixels. The method comprises the steps of: providing at least two control points for controlling the blend of the graphical object wherein the control points are capable of being interactively manipulated by a user and each control point has a corresponding color; altering the position of at least one of the control points, wherein the color blend is dependent on the control points; calculating the color of each one of the second predetermined number of pixels of the graphical object dependent on the altered position of the at least one of the control points; and displaying the calculated colors of the second predetermined number of pixels to provide a modified color blend of the graphical object.

Preferably, the method includes the step of storing the color and the position of each of the control points as part of the graphical object stored in the memory. Further, the at least two control points preferably define a line extending between the control points within the graphical object. Still further the calculating step can comprise the following steps which are carried out for each pixel (P) of the second predetermined number of pixels: determining if a projection of the pixel (P) intersects with the line; when the pixel (P) does intersect with the line, the color of the pixel (P) is specified to be a color dependent on the intersect with the color blend between the at least two control points; and otherwise, the color of the pixel (P) is specified to be a color dependent on the color of the nearest one of the at least two control points.

Optionally, the color blend comprises an opacity blend where each of the control points has an associated opacity value.

In accordance with a fourth aspect of the invention, there is provided an apparatus for controlling a color blend of a graphical object. The graphical object is displayed as part of a computer-generated image on a display means and the image is stored in memory coupled to a processing means. The image has a first predetermined number of pixels and the graphical object has a second number of pixels less than or equal to the first number of pixels. The apparatus comprises: means for providing at least two control points for controlling the blend of the graphical object, wherein the control points are capable of being interactively manipulated by a user and each control point has a corresponding color; means for altering the position of at least one of the control points, wherein the color blend is dependent on the control points; and means for calculating the color of each one of the second predetermined number of pixels of the graphical object dependent on the altered position of the at least one of the control points; wherein the calculated colors of the second predetermined number of pixels are displayed on the display means to provide a modified color blend of the graphical object.

Preferably, the apparatus comprises means for storing the color and the position of each of the control points as part of the graphical object stored in the memory. Further, the at least two control points preferably define a line extending between the control points within the graphical object. Still further, the calculating means operates on each pixel (P) of the second predetermined number of pixels and further comprises: means for determining if a projection of the pixel (P) intersects with the line; means for specifying the color of the pixel (P) to be a color dependent on the intersect with the color blend between the at least two control points when the pixel (P) does intersect with the line and for specifying the color of the pixel (P) to be the color of the nearest one of the at least two control points otherwise.

Preferably, the color blend comprises an opacity blend where each of the control points has an associated opacity value.

In accordance with a fifth aspect of the invention, there is provided a computer program product comprising a computer usable medium having computer readable program code means embodied in said medium for determining a color blend of a computer graphical object, said product including:

codes for providing a plurality of interactive control points, each of said control points having an associated colour value: and codes for calculating a color value of each portion of said graphical object dependent on its relative position to said control points.

In accordance with a sixth aspect of the invention, there is provided a computer program product comprising a computer usable medium having computer readable program code means embodied in said medium for controlling a color blend of a graphical object, said graphical object being displayed as part of a computer-generated image on display means and said image comprising a first predetermined number of pixels, wherein said image is stored in a memory coupled to a processing means, said graphical object having a second predetermined number of pixels less than or equal to said first predetermined number of pixels, said product including:

codes for providing at least two control points for controlling said blend of said graphical object, wherein said control points are capable of being interactively manipulated by a user and each control point has a corresponding color;

codes for altering the position of at least one of said control points, wherein said color blend is dependent on said control points;

codes for calculating the color of each one of the said second predetermined number of pixels of said graphical object dependent on the altered position of said at least one of said control points;

codes for displaying said calculated colors of said second predetermined number of pixels to provide a modified color blend of said graphical object.

BRIEF DESCRIPTION OF THE DRAWINGS

The preferred embodiment of the present invention will now be described with reference to the accompanying drawings, in which.

DETAILED DESCRIPTION

Figure 1:
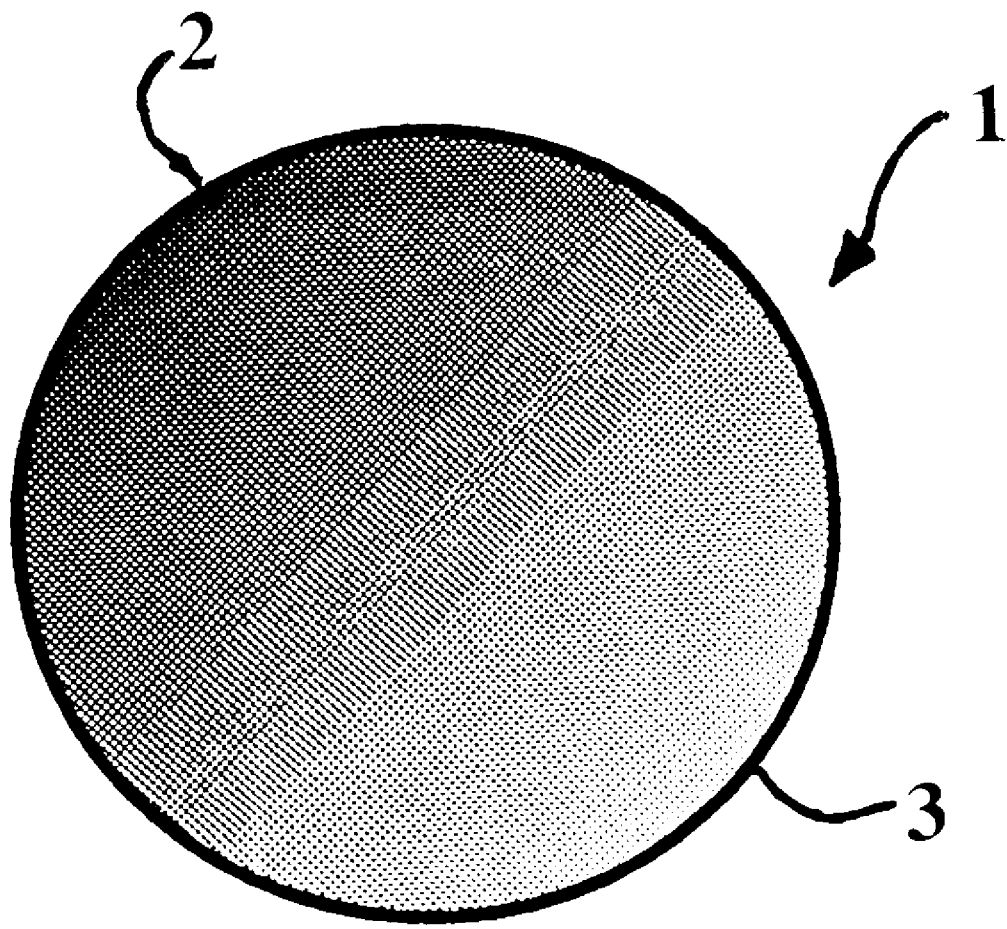
FIG. 1 illustrates an object having a blend.
Figure 2:
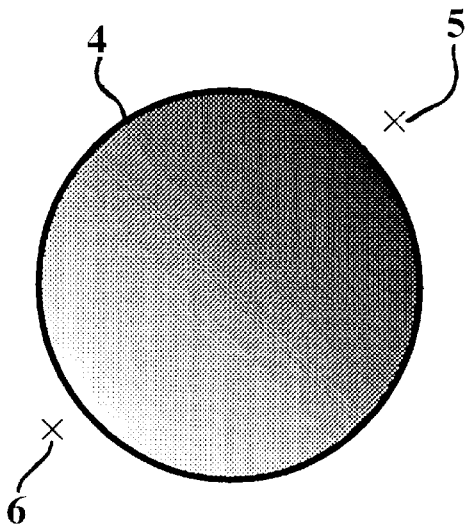
FIGS. 2 to 5 illustrate the process of creating blends in accordance with the preferred embodiment.

In the method and apparatus according to the preferred embodiment, a number of control points are provided to independently control the color blend of an object. FIG. 2 illustrates a circle 4 having a blend in accordance with the preferred embodiment. The blend is in the same direction as a notional line extending between a first control point S and a second control point 6. The first control point 5 is defined to have a first blend color and the second control point 6 is defined to have a second blend color. The object 4 preferably has a linear blend between the two colors, with the linear blend of the object 4 only being displayed within the border of the object 4 (i.e., the linear blend is "clipped" within the object). The control points 5 and 6 can be used in accordance with the preferred embodiment to control the blend to achieve much greater accuracy when manipulating the color blend of the object 4, thereby overcoming a significant disadvantage of the prior art.

Figure 7:
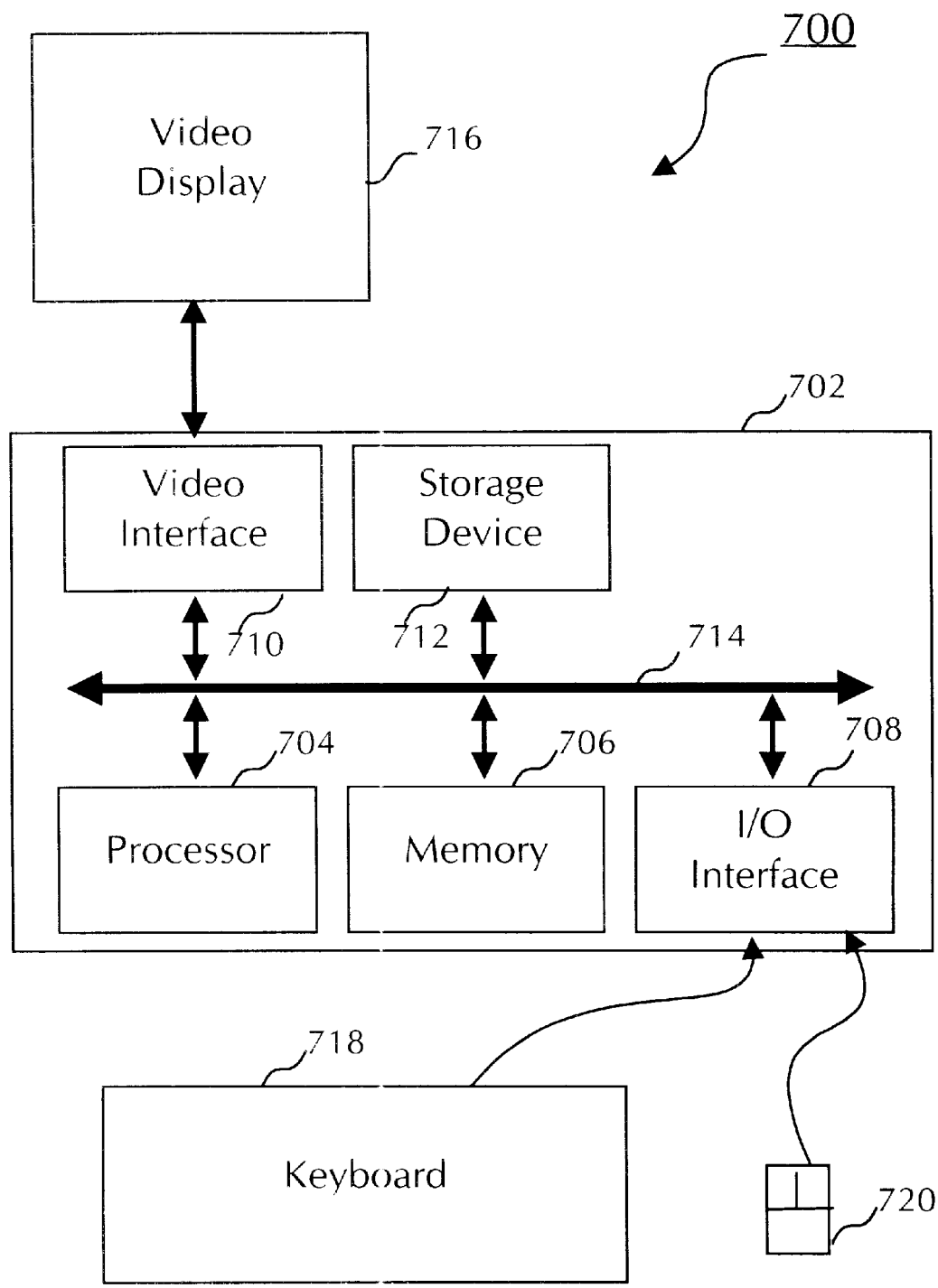
FIG. 7 is a block diagram illustrating a general purpose computer that can be used to practice the preferred embodiment of the invention.

The method and apparatus for controlling a color blend within a computer-generated graphical object according to the preferred embodiment is preferably implemented using a general-purpose computer. A representative embodiment of such a general-purpose computer system is illustrated in FIG. 7. The computer system 700 consists of a computer 702, a video display 716, and input devices 718, 720. In addition, the computer system 700 can also have any of a number of other output devices including line printers, laser printers, plotters, and other reproduction devices connected to the computer 702. The computer system 700 can be connected to one or more other computers using an appropriate communication channel such as a modem communications path, a computer network, or the like.

The conventional computer 702 itself preferably consists of a central processing unit(s) (simply referred to as a processor hereinafter) 704, memory 706 which can include random access memory (RAM) and read-only memory (ROM), an input/output (I/O) interface 708, a video interface 710, and one or more storage devices generally represented by a block 712 in FIG. 7. The storage device(s) 712 can consist of one or more of the following: a floppy disc, a hard disc drive, a magneto-optical disc drive, CD-ROM or any other of a number of non-volatile storage devices well-known to those skilled in the art. Each of the components 704 to 712 is typically connected to one or more of the other devices via a bus 714 that in turn consists of data, address, and control buses.

The video interface 710 is connected to the video display 716 and provides video signals from the computer 702 for display on the video display 716 via the video interface 710. User inputs to operate the computer 702 can be provided by one or more input devices. A user can use the keyboard 718 and/or a pointing device such as the mouse 720 to provide input to the computer 702. The overall structure and individual elements of the computer system 700 are conventional and are well known to persons skilled in the art. For example, the video interface 710 could include video RAM (VRAM). Thus, the system 700 is simply provided for illustrative purposes and other configurations can be employed without departing from the scope and spirit of the invention. Operation of the system according to the preferred embodiment will now be described with reference to FIGS. 8 and 9.

Figure 8:
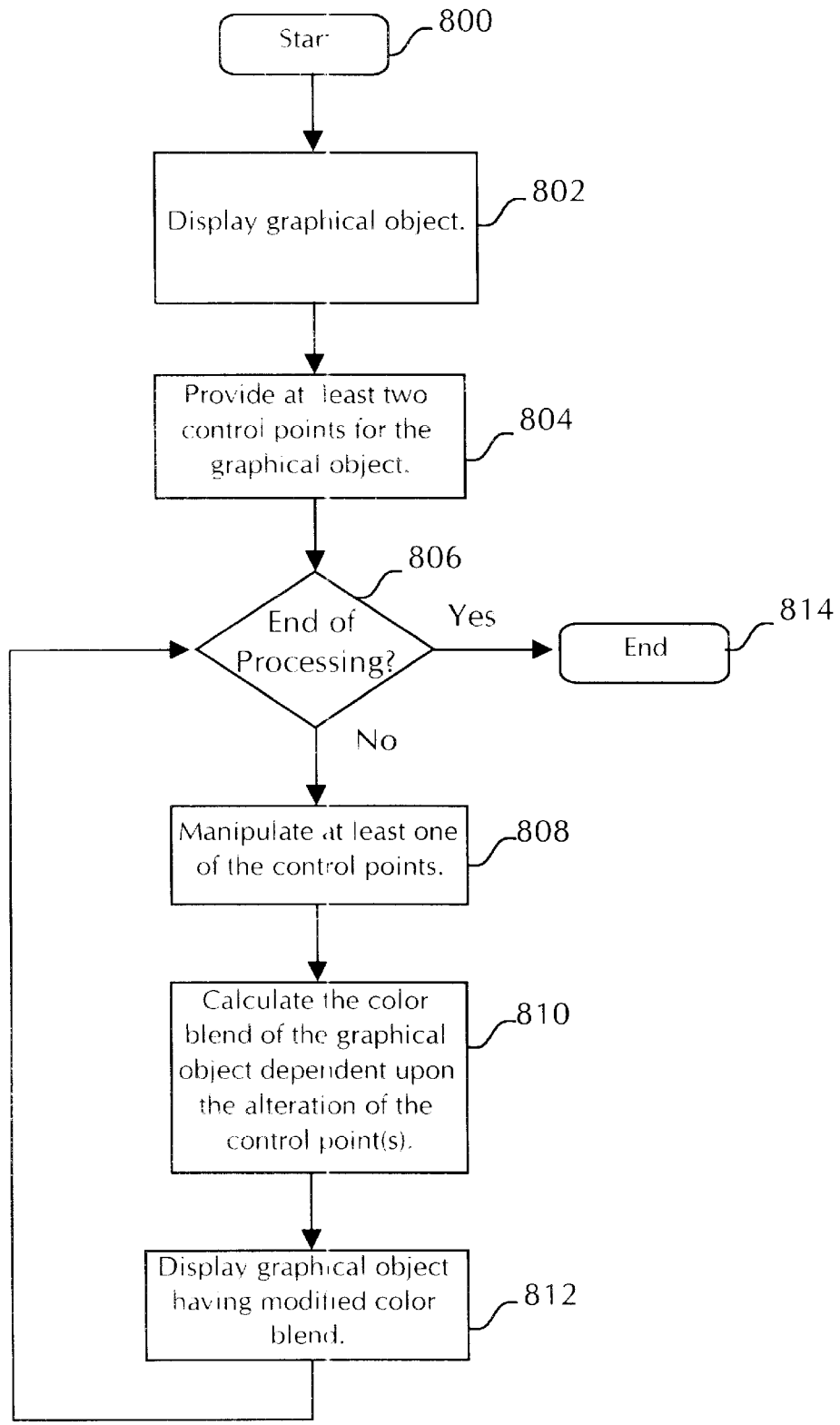
FIG. 8 is a flow diagram illustrating a method according to the preferred embodiment for controlling the color blend of a computer-generated graphical object.

FIG. 8 is a general flow diagram illustrating the steps of controlling a blend of a graphical object in a computer generated image in accordance with the preferred embodiment. While the following description makes reference to a "color" blend, it will be apparent to a person skilled in the art that the invention is equally applicable to an opacity blend, or a color and opacity blend. The practice of providing an opacity value for each point or pixel in an image, in addition to a color value (e.g. RGB), is well known to persons skilled in the art. To clarify the invention, the following description simply makes reference to color values of a blend. Processing starts at step 800. In step 802, the computer-generated graphical object is displayed on the video display system 716 by the computer 702. The graphical object consists of a number of pixels and the object itself is part of a computer-generated image displayed on the video display 716. The image includes one or more graphical object. To clarify the invention, only a single graphical object is referred to. However, it will be apparent to a person skilled in the art that the present invention is applicable to a plurality of separate graphical objects as well as complex graphical objects each containing a number of graphical objects. In step 804, at least two control points for controlling the color blend of the graphical object are provided. As will be described below, the control points are preferably represented by X's in FIGS. 2 to 6 displayed to the user on the video display 716. In step 806, a check is made to determine if processing should terminate. If decision block 806 returns true (yes), processing terminates at step 814. Otherwise, if decision block 806 returns false (no), processing continues at step 808.

In step 808, the user can manipulate one or more of the control points of the graphical object. Preferably, this is carried out by the user using the mouse 720 to click on one of the control points represented on the video display 716 and to alter its position, thereby affecting the color blend of the graphical object. As will be described below with reference to FIGS. 2 to 6, this enables a user to finely control the color blend of a graphical object.

In step 810, in response to interactive user inputs to manipulate the control points, the color blend of the graphical object is calculated dependent upon the alteration or movement of the control point(s). This processing is preferably carried out using the computer 702. The control points each have a corresponding color which relates to the color blend of the graphical object. Further, a notional line is defined between the first and second control points corresponding to the color blend between the colors of the first and the second control points. The direction and the gradient of the color blend within the graphical object is dependent upon the relative position of the control points in relation to the graphical object. In turn, the color of each point (e.g., pixel) within the graphical object is calculated dependent upon the projection of the point at a right angle onto the line between the two control points. In step 812, the graphical object having the modified color blend is displayed on the video display 716 by the computer 702. Preferably, the color blend of the graphical object is carried out interactively using steps 808 to 812 so that the displayed blend of the graphical object is modified and updated as the user clicks on and moves a control point. Processing then continues at decision block 806. It will be apparent to a person skilled in the art that while the flow diagram of FIG. 8 has a control loop beginning with the decision block 806 to determine if processing is to continue followed by steps 808 to 812, control of the processing can be equivalently governed in a number of other ways using differing control structures or loops without departing from the scope and spirit of the present invention.

Figure 9:
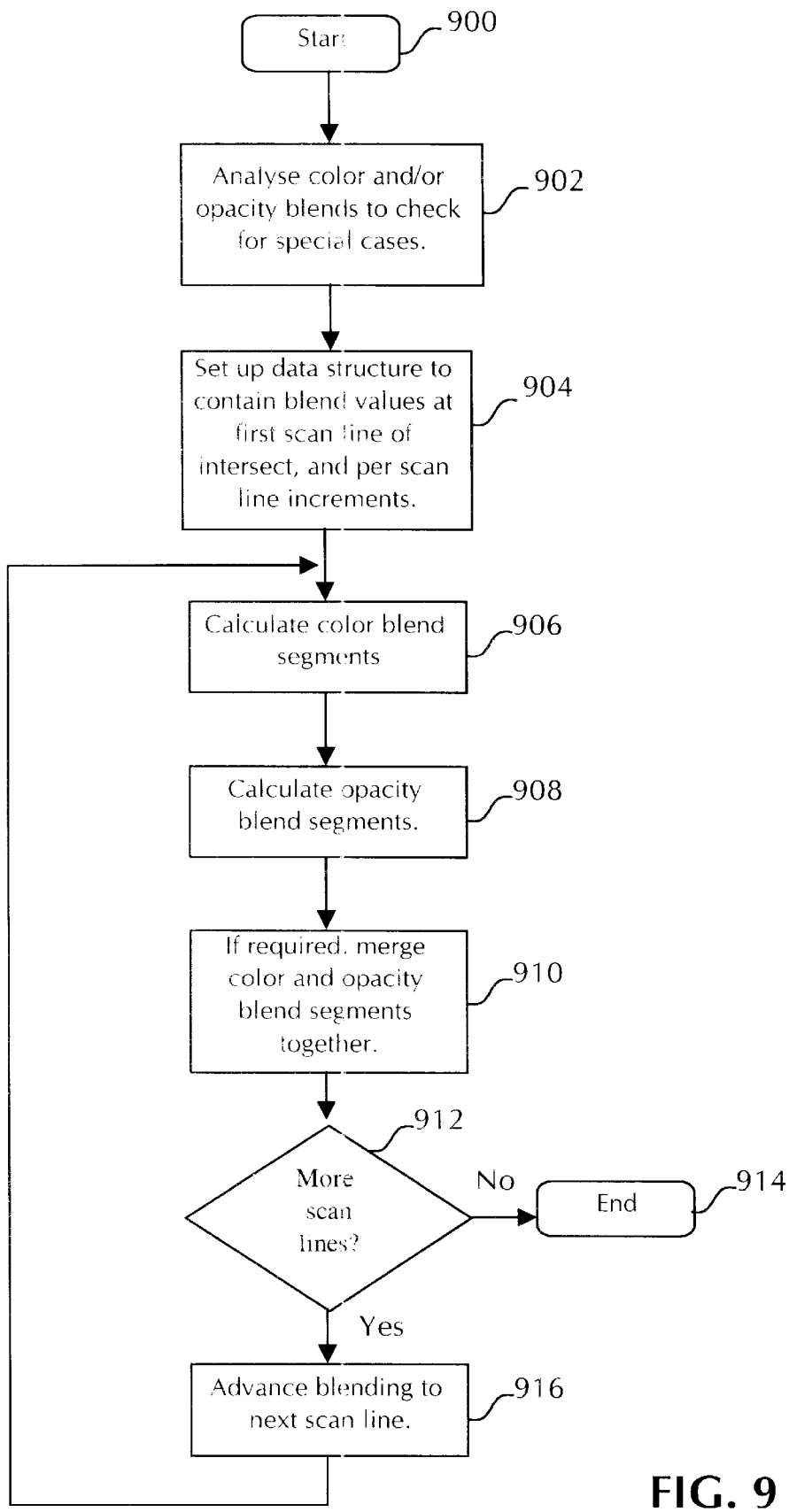
FIG. 9 is a flow diagram illustrating a method of calculating the color of each point within the computer-generated graphical object in accordance with the preferred embodiment.

FIG. 9 is a detailed flow diagram illustrating the process of calculating the color/opacity values of points of the blend within the graphical object according to the preferred embodiment. The actual source code for implementing the preferred embodiment is set forth in Annexure A, which is incorporated herein by reference. Processing begins at step 900. In step 902, the color and/or opacity blends of the graphical object are checked to determine special cases. It will be appreciated by a person skilled in the art that the present invention is applicable to color blends or opacity blends, or a combination of the two. However, to clarify the invention, the invention is simply described with reference to color blends. In this step, for example, the control points are checked to determine if they are to close. In step 904, the data structure of the graphical object stored in memory is set up to contain blend values at a first scan line of the intersect and per scan line increments.

In step 906, the color blend segments are calculated. In step 908, the opacity blend segments are calculated. In step 910, if required, the color and opacity blend segments are merged together. In decision block 912, a check is made to determine if there are more scan lines to be processed. If decision block 912 returns false (no), processing terminates at step 914. Otherwise, if decision block 912 returns true (yes), processing continues at step 916. In step 916, the color blending is advanced to the next scan line. Processing then continues at step 906.

Figure 3:
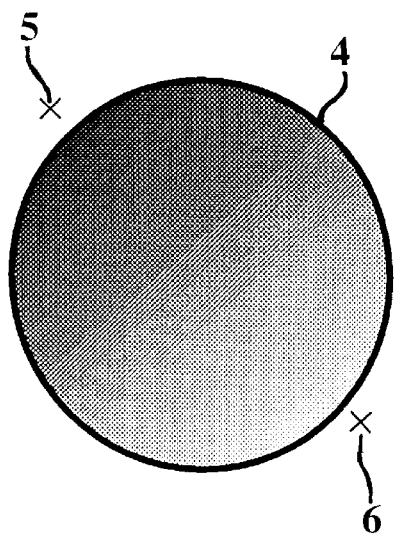

In FIG. 3, each of the object control points 5 and 6 can be independently moved, and therefore the object 4 has a differently oriented blend than that of FIG. 2 due to the blend points 5 and 6 having been moved to the points illustrated. Once moved, the blend is recalculated in the same way as the blend was originally calculated with reference to the object of to FIG. 2.

By using control points to control the blend of an object, the method and apparatus according to the preferred embodiment allows for a much greater ability to control other aspects of the blend. For example, referring now to FIG. 4, the control points 5 and 6 are moved away from one in relation to the object 4 to produce a lower gradient of the blend with finer changes in color.

Figure 5:
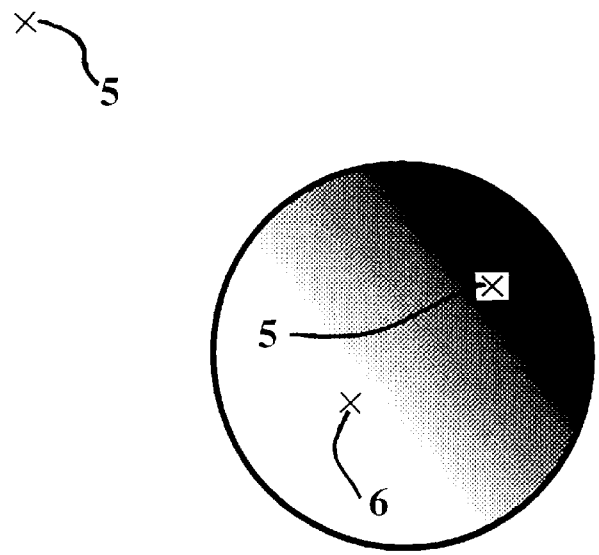

In FIG. 5, the control points 5 and 6 are moved close together inside the graphical object 4 to produce a greater gradient in the blend having a coarser change in color. In this case, those points of the object not lying between the control points 5 and 6 are preferably defined to have a color content value equal to that defined by the nearest one of control points 5 and 6 to produce a gradient of blend within object 4.

It can therefore be seen that by using the control points to control the blend, accurate positioning and variation of the blend can be easily achieved. By making the control points 5 and 6 part of the structure utilised to define the object 4, they can be made to be always available to alter the blend of a graphical object at a later stage, thereby providing maximum flexibility.

Figure 4:
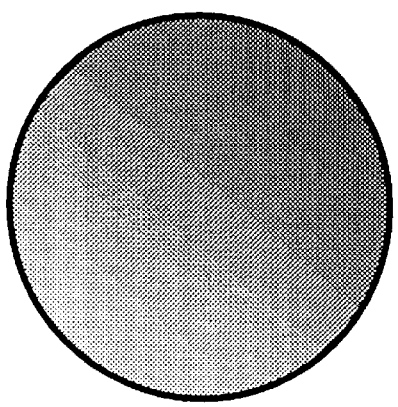

By way of example, reference is made to the method of FIG. 8 and the graphical object 4 shown in FIGS. 4 and 5. Firstly, with reference to object 4 of FIG. 4, the graphical object 4 is displayed on the video display 716 in step 802 of FIG. 8. In step 804, the control points 5, 6, which form part of the graphical object 4, are provided. For example, the control points 5 and 6 can be positioned initially as shown in FIG. 4 for the color blend of FIG. 4.

If processing has not been terminated by the user at decision block 806, execution continues at step 808. In step 806, the user can alter the blend by manipulating one of the control points 5, 6 using the mouse 720 of FIG. 7, for example. As such, the user could click on control point 5 and move it inwardly toward control point 6 and position it within graphical object 4. The preferred embodiment is preferably implemented by interactively updating the blend of the graphical object 4, as a control point 5, 6 is moved. Thus, the color blend is recalculated in step 810 and the modified blend displayed in step 812, with processing continuing at step 806. These steps 806 to 812 can be repetatively carried out as the blend is incrementally updated with movement of the control point 5 from its initial position in FIG. 4 to final position inside the graphical object 4. Likewise, the second control point 6 can be moved inwardly and the blend of graphical object 4 interactively updated until the control point is released within the graphical object 4 as shown in FIG.

In FIG. 5, instead of the graphical object 4 having a continuous blend throughout as shown in FIG. 4, the gradient of the blend is very steep in the intermediate region of the graphical object 4. The opposite end regions of the graphical object 4 corresponding to control points 5 and 6 are black and white, respectively, in accordance with the color of the respective control points.

Figure 6:
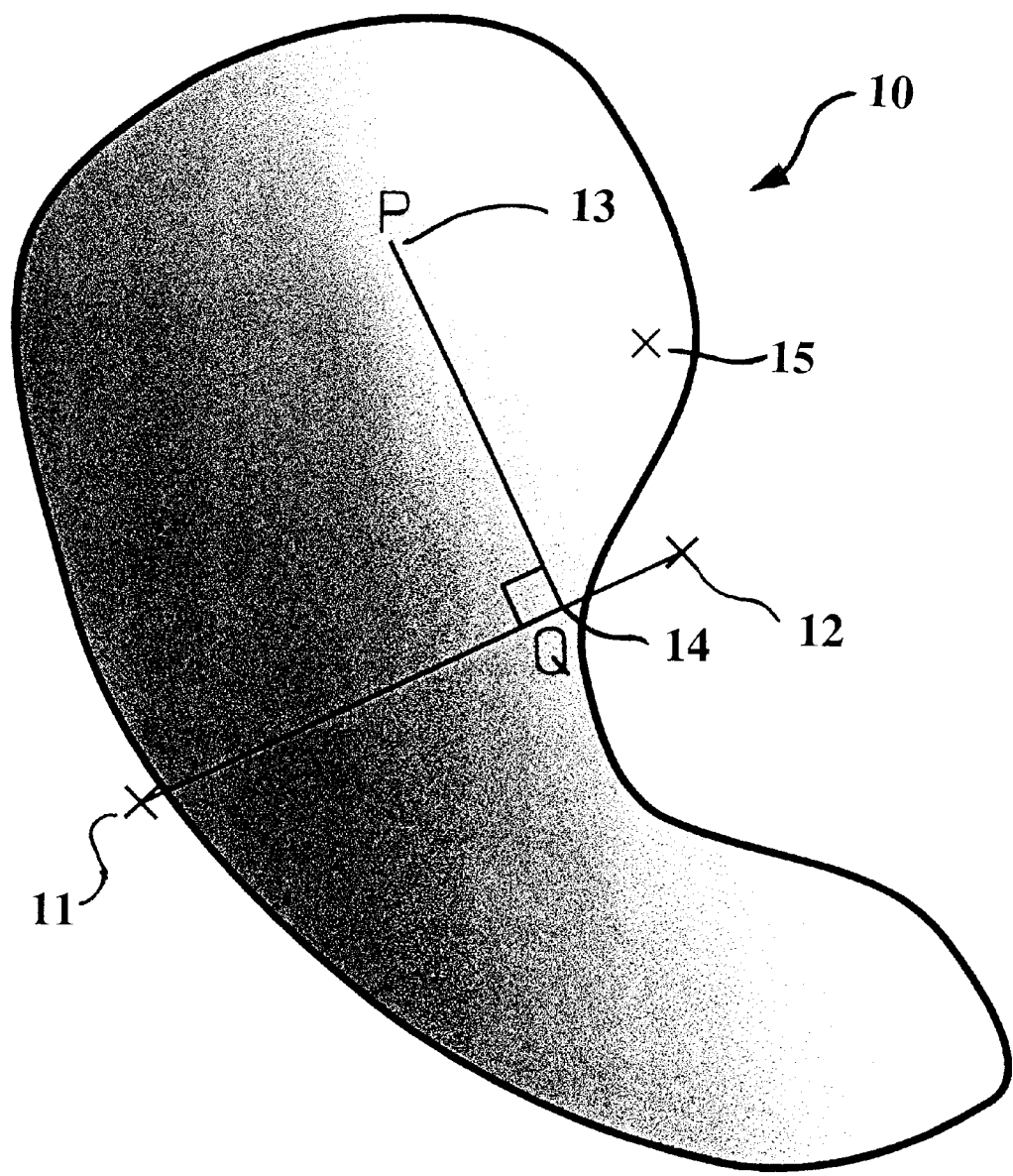
FIG. 6 illustrates the process of calculation of a color value of a particular point of an object in accordance with the preferred embodiment.

Referring now to FIG. 6, there is shown a second graphical object 10 having blend control points 11 and 12. To calculate the color value of any point (P)13, within the object 10, the projection 14 of the point 13 onto the notional line between the control points 11 and 12 is first determined. The ratio of the distance between the points 11 and 14 and points 14 and 12 is then determined. The color of the point 13 can then be determined by a simple linear combination dependent on the distance. Points having a projection 14 that falls outside the interval between the control points 11 and 12 are assigned the color corresponding to the nearest control point 11 or 12. For example, the point 15 will have a projection outside the interval between 11 and 12. Therefore, the point 15 has its color assigned to be the same value as that of the control point 12. The color of the point 13 is calculated using Equation 1.

If C1 is the defined color of the control point 11 and C2 is the defined color of the control point 12, the color value at point P is given by:

$$C(P)=xC2+(1-x)C1, \tag{1}$$

where x is the ratio of the interval from the control point 11 to the point 14 in comparison with the interval from the control point 11 to the control point 12.

A blend value need only be calculated for those points lying inside the object 10 and the well-known process of clipping can be used to determine those points lying within the graphical object 10.

As stated previously, the process of calculation of a blend is known in the art. However, the embodiment of the invention is particularly advantageous in that the use of control points are provided.

To further instruct those skilled in the art, the attached Appendix A includes a "C" program for the calculation of a blend on a scan line by scan line order in accordance with the above formula. The enclosed program includes portions which calculate a blend of an object given the color components of two control points. Of course, other known technologies could be used such as the well-known "filling" technique. Both of these techniques for rendering an image are disclosed in the standard reference such as Foley, Van Dam, et. al, *Computer Graphics: Principles and Practice,* Addison-Wesley Publishing Company, Inc., 1990.

The present invention can be applied to a system constituted by a number of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus. The program codes can be read by a computer (e.g., CPU, MPU) of the system or apparatus from the storage medium. The computer can then execute the program.

In this case, the program codes read from the storage medium constitute an implementation or realization of the functions according to the above embodiment, and the storage medium storing the program codes constitutes another embodiment of the invention.

Further, the storage medium (e.g., a floppy disk, a hard disk, an optical disk, a magneto-optical disk, CD-ROM, CD-R, a magnetic tape, a non-volatile type memory card, or a ROM) can be used for providing the program codes. Besides the aforesaid functions according to the above embodiments being realized by executing the program codes which are read by a computer, a further embodiment of the invention includes the case in which an operating system (OS) or the like carried out on the computer performs a part or entire processes in accordance with designations of the program codes and realizes functions according to the above embodiments.

Finally, yet another embodiment of the invention also includes the case in which, after the program codes read from the storage medium are written in a function expansion card which can be inserted into the computer or in a memory provided in a function expansion unit which is connected to a computer (CPU) or the like contained in the function expansion card, the computer performs a part of or the entire process in accordance with designations of the program codes and realizes functions of the above embodiments.

The foregoing describes a small number of embodiment of the present invention. Modifications and changes can be made thereto without departing from the spirit and scope of the invention.

- 15 -

APPENDIX A

```
/*
 * $RCSfile: bi-init.c,v $ -- Initialise scan line interpolation of colour and/or opacity
blend
 *
 * $Author: george $    $Date: 1994/06/21 03:12:36 $
 *
 *
 * Copyright (C) 1994, Canon Information Systems Research Australia.
 *    All rights reserved.
 *
 *
 * Who is the current $Locker: $
 *
 * CHANGE HISTORY:
 * --------------
 *
 * $Log: bi-init.c,v $
 * Revision 1.2  1994/06/21  03:12:36  george
 * Comment changes to allow automatic manual entry generation.
 *
 * Revision 1 1  1994/06/06  01:21:00  george
 * Initial revision
 *
 * ===
 */ include <defs.h>
include <bi.h>
include <bi-blender.h>
include <math.h> static char what_id[] = "@(#) bi/$Id: bi-init.c,v 1.2 1994/06/21 03:12:36 george Exp $"; UNUSED(what_id);

define IMPLIES(p, q)   (!(p) || (q))

/*
 * Set up an individual opacity or colour blend.
 *
 * Return a flag indicating whether or not the blend is indeterminate,
 * independent of x, or general.
 */
```

- 16 -

```
    static int
    init_blend
    (
        BI_BlendInterpolator *bi,
5       int             start_component,
        int             num_components,
        float   const   *a1,
        float   const   *a2,
        double          x1,
10      double          y1,
        double          x2,
        double          y2,
        double          min_x,
        double          max_x,
15      double          component_tolerance,
        int             first_scan_line
    )
    {
        int         i, n;
20      double      dsqr;   /*square of distance between endpoints*/
        double      dx, dy;

ASSERT(bi != NULL && a1 != NULL && a2 != NULL, "NULL pointer");
        ASSERT
25      (
            0 <= start_component
            && 0 < num_components
            && num_components+start_component <= DIL_NUM_CO_COMPONENTS,
            "arguments out of range"
30      );
        ASSERT(min_x < max_x, "arguments out of range");

bi->bi_StartComponent = start_component;
        bi->bi_NumComponents  = num_components;
35      for (i = start_component, n = 0; n < num_components; ++n, ++i)
        {
            bi->bi_Components1[i] = a1[n];
            bi->bi_Components2[i] = a2[n];
        }
40      dy   = y2 - y1;
        dx   = x2 - x1;
        dsqr = dx*dx + dy*dy;
        if (dsqr <= 1e-16)
        {
45          /*
             * End points are too close.
             *
             * Choose a scan line dividing between the region of the first
```

- 17 -

```
         * colour/opacity and the region of the second colour/opacity.  Ignore
         * the miniseculely thin region of blending in-between.
         *
         * `bi_RelY' is the current scan line number, relative to the dividing
5        * line.
         */
         bi->bi_RelY = first_scan_line - floor(0.5*(y1 + y2 + 1.));
         return BI_INDET;
      }
10    else
      {
         double    max_abs_a_diff = 0;
         double    abs_a_diff;

15       for (i = start_component, n = 0; n < num_components; ++n, ++i)
         {
            bi->bi_ComponentDiff[i] = a2[n] - a1[n];
            if ((abs_a_diff = bi->bi_ComponentDiff[i]) < 0.)
               abs_a_diff = -abs_a_diff;
20          if (abs_a_diff > max_abs_a_diff)
               max_abs_a_diff = abs_a_diff;
         }
         if
         (
25          (dx < 0. ? -dx : dx) * (max_x - min_x) * max_abs_a_diff
            <
            dsqr * component_tolerance
         )
         {
30          /*
             * The maximum component change over range of y values for which
             * interpolation will be required is less than the smallest
             * component difference representable on the target output device
             * (e.g., 1/256 for eight bit components).
35           *
             * We can the avoid ill-conditioned situation of intersecting scan
             * lines with near-parallel blend lines u=0 and u=1, and simplify
             * the computations as well, by having a constant value of u for
             * each entire scan line.
40           */
            bi->bi_DuDy = dy / dsqr;
            bi->bi_BaseU = (first_scan_line + 0.5 - y1)*bi->bi_DuDy
                       + (0.5*(min_x + max_x) - x1)*dx/dsqr;
            return BI_INDEPX;
45       }
         else
         {
            /*
```

- 18 -

```
         * General case. No pathological situations.
         */
         bi->bi_DuDy = dy / dsqr;
         bi->bi_DuDx = dx / dsqr;
   5     bi->bi_DxDu = dsqr / dx;
         bi->bi_BaseU = (first_scan_line + 0.5 - y1)*bi->bi_DuDy
                        + (0.5 - x1)*bi->bi_DuDx;
         return BI_GENERAL;
       }
  10 }
     /*NOTREACHED*/
  }

15 /* EXTERN
     * BI_init_blender - initiate colour/opacity blend interpolation
     *
     * This function creates a "blender" that can interpolate a given colour blend,
     * opacity blend or both together. If the same blend is used for more than one
  20 * object, a separate blender is required for each object.
     *
     * Parameters
     * c1, c2        The colour component values at the two endpoints of the
     *               line segment defining the blend. "NULL" must be passed
  25 *               for an opacity only blend.
     *
     * c_x1, c_y1, c_x2, c_y2
     *               The coordinates of the endpoints of the line segment
     *               defining the colour blend.
  30 *
     * o1, o2        The opacity component values at the two endpoints of the
     *               line segment defining the blend. "NULL" must be passed
     *               for a colour only blend.
     *
  35 * o_x1, o_y1, o_x2, o_y2
     *               The coordinates of the endpoints of the line segment
     *               defining the opacity blend.
     *
     * min_x, max_x  Bounds on the x values for which blends will be
  40 *               requested.
     *
     * component_tolerance The smallest distinguishable component difference on the
     *               target output device.
     *
  45 * first_scan_line  The y coordinate of the first scan line in which blend
     *               interpolation is needed. Blend interpolation will be
     *               provided on consecutive scan lines starting from this
     *               one.
```

- 19 -

```
    *
    * Return value
    * The created blender, or "NULL" on memory allocation error (no error
    * message is set). The blender may be deallocated with "MEM_free".
5   */
    BI_Blender*
    BI_init_blender
    (
        float    const   *c1,
10      float    const   *c2,
        double           c_x1,
        double           c_y1,
        double           c_x2,
        double           c_y2,
15      float    const   *o1,
        float    const   *o2,
        double           o_x1,
        double           o_y1,
        double           o_x2,
20      double           o_y2,
        double           min_x,
        double           max_x,
        double           component_tolerance,
        int              first_scan_line
25  )
    {
        BI_Blender      *blender;
        int             colour_type = 0;
        int             opacity_type = 0;
30
        ASSERT(c1 != NULL || o1 != NULL,       "invalid arguments");
        ASSERT(IMPLIES(c1 != NULL, c2 != NULL),  "inconsistent arguments");
        ASSERT(IMPLIES(o1 != NULL, o2 != NULL),  "inconsistent arguments");
        ASSERT(min_x <= max_x,                 "invalid arguments");
35      ASSERT(component_tolerance > 0,        "argument out of range");

blender = (BI_Blender*)MEM_malloc(sizeof(BI_Blender));
        if (blender == NULL)
            return NULL;
40
        if (c1 != NULL)
            colour_type =
                init_blend
                (
45                  &blender->b_Colour,
                    0, DIL_NUM_C_COMPONENTS,
                    c1, c2,
                    c_x1, c_y1, c_x2, c_y2,
```

- 20 -

```
              min_x, max_x,
              component_tolerance,
              first_scan_line
           );
     if (o1 != NULL)
         opacity_type =
            init_blend
            (
               &blender->b_Opacity,
               DIL_NUM_C_COMPONENTS, DIL_NUM_O_COMPONENTS,
               o1, o2,
               o_x1, o_y1, o_x2, o_y2,
               min_x, max_x,
               component_tolerance,
               first_scan_line
            );
     blender->b_BlendType = colour_type | opacity_type < <BI_O_SHIFT;

/*
      * If blends correspond in terms of classification and endpoints, then
      * treat them as parametrically equivalent. They can then be interpolated
      * together.
      */
     if
     (
         colour_type == opacity_type
         && c_x1 == o_x1
         && c_y1 == o_y1
         && c_x2 == o_x2
         && c_y2 == o_y2
     )
     {
         blender->b_BlendType |= BI_PARAM_EQUIV;
         blender->b_Colour.bi_Components1[DIL_NUM_C_COMPONENTS]   = *o1;
         blender->b_Colour.bi_Components2[DIL_NUM_C_COMPONENTS]   = *o2;
         blender->b_Colour.bi_ComponentDiff[DIL_NUM_C_COMPONENTS] = *o2 - *o1;
         blender->b_Colour.bi_NumComponents = DIL_NUM_CO_COMPONENTS;
     }

ASSERT(blender->b_BlendType != 0, "invalid blend type");
     return blender;
}

/*
 * $RCSfile: bi-interp.c,v $ -- Interpolate colour and/or opacity blend on current scan
 line
```

```
 *
 * $Author: andy $    $Date: 1996/03/21 01:02:19 $
 *
 *
 * Copyright (C) 1994, Canon Information Systems Research Australia.
 *      All rights reserved.
 *
 *
 * Who is the current $Locker: $
 *
 * CHANGE HISTORY:
 * ---------------
 *
 * $Log: bi-interp.c,v $
 * Revision 1.3  1996/03/21 01:02:19  andy
 * Trivial mod. to stop compiler warning.
 *
 * Revision 1.2  1994/06/21 03:12:38  george
 * Comment changes to allow automatic manual entry generation.
 *
 * Revision 1.1  1994/06/06 01:21:02  george
 * Initial revision
 *
 * ===
 */ include <defs.h>
include <bi.h>
include <bi-blender.h>
include <bi-slbp.h> static char what_id[] = "@(#) bi/$Id: bi-interp.c,v 1.3 1996/03/21 01:02:19 andy Exp $"; UNUSED(what_id);

/*
 * Macros for filling in blend point component arrays in various ways.
 */

/*
 * Base macro, called by others to loop over all components.
 * "ASSIGNi" is an assignment to component "i".
 */
#define SET_COMPONENTS(start, num, ASSIGNi)                     \
    do                                                          \
    {                                                           \
        int i, n;                                               \
        for (i = (start), n = (num); n/*!=0*/; ++i, --n)        \
```

- 22 -

```
        ASSIGNi;                                              \
    } while (0)

/*
 * Set components by copying them.
 */
#define FILL_COMPONENTS(slbp, src, bi)                        \
    SET_COMPONENTS                                            \
    (                                                         \
        (bi)->bi_StartComponent, (bi)->bi_NumComponents,      \
        (slbp)->slbp_CO[i] = (src)[i]                         \
    )

#define FILL2_COMPONENTS(slbp, k0, k1, src, bi)               \
    SET_COMPONENTS                                            \
    (                                                         \
        (bi)->bi_StartComponent, (bi)->bi_NumComponents,      \
        (slbp)[k0].slbp_CO[i] = (slbp)[k1].slbp_CO[i] = (src)[i]  \
    )

/*
 * Set components by interpolating them at parametric value "u".
 */
#define INTERP_COMPONENTS(slbp, u, bi)                        \
    SET_COMPONENTS                                            \
    (                                                         \
        (bi)->bi_StartComponent, (bi)->bi_NumComponents,      \
        (slbp)->slbp_CO[i] =                                  \
            (bi)->bi_Components1[i] + (u)*(bi)->bi_ComponentDiff[i]  \
    )

#define INTERP2_COMPONENTS(slbp, k0, k1, u, bi)               \
    SET_COMPONENTS                                            \
    (                                                         \
        (bi)->bi_StartComponent, (bi)->bi_NumComponents,      \
        (slbp)[k0].slbp_CO[i] = (slbp)[k1].slbp_CO[i] =       \
            (bi)->bi_Components1[i] + (u)*(bi)->bi_ComponentDiff[i]  \
    )

/*
 * Set first/next scan line blend point to given pixel number and value.
 * Value is determined by "METHOD", which is an invocation of one of the above
 * macros.
 *
 * Each point after the first is only set if it is at least one pixel away from
 * the previous point.  Given any three points, the first two or the last two
 * (at least) will have the same blend value, so that leaving one point out
 * will not upset the visual appearance.
```

- 23 -

```
    */
    #define FIRST_POINT(slbp, x, METHOD)                  \
        do                                                \
        {                                                 \
5           (slbp)->slbp_Pixel = (x);                     \
            METHOD;                                       \
        } while (0)

#define NEXT_POINT(slbp, x, METHOD)                   \
10      do                                                \
        {                                                 \
            if ((x) > (slbp)->slbp_Pixel)                 \
            {                                             \
                (++(slbp))->slbp_Pixel = (x);             \
15              METHOD;                                   \
            }                                             \
        } while (0)

20  /*
     * indeterminate_blend
     *
     * Interpolates an indeterminate blend, by filling "blend_runs" with a single
     * blend run of constant value.
25   *
     * Returns the number of blend runs, 1 in this case.
     */
    static int
    indeterminate_blend
30  (
        BI_ScanLineBlendPoint *blend_runs,
        BI_BlendInterpolator *bi,
        int             start_pixel,
        int             end_pixel
35  )
    {
        float           *c;

if (bi->bi_RelY < 0)
40          c = bi->bi_Components1;
        else
            c = bi->bi_Components2;
        FILL2_COMPONENTS(blend_runs, 0, 1, c, bi);
        blend_runs[0].slbp_Pixel = start_pixel;
45      blend_runs[1].slbp_Pixel = end_pixel;

return 1;
    }
```

```
/*
 * other_blend_indeterminate
 *
 * Given a series of blend segments in "blend_runs" for one blended attribute,
 * fill in the other attribute in all the blend runs with an interpolated
 * indeterminate blend.
 *
 * Parameters
 *   blend_runs      Array of points defining a piece-wise linear blend along
 *                   a scan line.
 *   bi              Data structure storing information for the indeterminate
 *                   blend with which to fill "blend_runs".
 *   num_segs        Number of blend segments in "blend_runs". The number
 *                   of array entries used is one more than this.
 *
 * Returns "num_segs".
 */
static int
other_blend_indeterminate
    (
        BI_ScanLineBlendPoint *blend_runs,
        BI_BlendInterpolator *bi,
        int                   num_segs
    )
{
    int     k;
    float   *c;

if (bi->bi_RelY < 0)
        c = bi->bi_Components1;
    else
        c = bi->bi_Components2;
    for (k = 0; k <= num_segs; ++k)
        FILL_COMPONENTS(blend_runs+k, c, bi);

return num_segs;
}

/*
 * independent_of_x_blend
 *
 * Interpolates an independent of y blend, by filling "blend_runs" with a
 * single blend run of constant value, the value being determined by the
 * parametric value on the current scan line.
 *
```

```
                                    - 25 -

* Returns the number of blend runs, 1 in this case.
     */
     static int
     independent_of_x_blend
 5   (
        BI_ScanLineBlendPoint *blend_runs,
        BI_BlendInterpolator *bi,
        int           start_pixel,
        int           end_pixel
10   )
     {
        if (bi->bi_BaseU <= 0.)
            FILL2_COMPONENTS(blend_runs, 0, 1, bi->bi_Components1, bi);
        else if (bi->bi_BaseU < 1.)
15          INTERP2_COMPONENTS(blend_runs, 0, 1, bi->bi_BaseU, bi);
        else
            FILL2_COMPONENTS(blend_runs, 0, 1, bi->bi_Components2, bi);
        blend_runs[0].slbp_Pixel = start_pixel;
        blend_runs[1].slbp_Pixel = end_pixel;
20
        return 1;
     }

/*
25   * other_blend_independent_of_x
     *
     * Given a series of blend segments in "blend_runs" for one blended attribute,
     * fill in the other attribute in the blend runs with an interpolated
     * independent of y blend.
30   *
     * Parameters
     * blend_runs    Array of points defining a piece-wise linear blend along
     *               a scan line.
     * bi            Data structure storing information for the indeterminate
35   *               blend with which to fill "blend_runs".
     * num_segs      Number of blend segments in "blend_runs". The number
     *               of array entries used is one more than this.
     *
     * Returns "num_segs".
40   */
     static int
     other_blend_independent_of_x
     (
        BI_ScanLineBlendPoint *blend_runs,
45      BI_BlendInterpolator *bi,
        int           num_segs
     )
     {
```

- 26 -

```
     int         k;

if (bi->bi_BaseU <= 0.)
     {
5       for (k = 0; k <= num_segs; ++k)
           FILL_COMPONENTS(blend_runs+k, bi->bi_Components1, bi);
     }
     else if (bi->bi_BaseU < 1.)
     {
10      for (k = 0; k <= num_segs; ++k)
           INTERP_COMPONENTS(blend_runs+k, bi->bi_BaseU, bi);
     }
     else
     {
15      for (k = 0; k <= num_segs; ++k)
           FILL_COMPONENTS(blend_runs+k, bi->bi_Components2, bi);
     } return num_segs;
20 }

/*
    * general_blend
    *
25  * Interpolates a general blend, by filling "blend_runs" with a series of one
    * or more blend segments.
    *
    * Returns the number of blend segments generated, in the range 1 to 3.
30  */
   static int
   general_blend
   (
      BI_ScanLineBlendPoint *blend_runs,
35    BI_BlendInterpolator *bi,
      int         start_pixel,
      int         end_pixel
   )
   {
40    /*
       * Parametric value at centres of first and last pixel in run.
       * u <= 0        blend value = bi_Components1
       * 0 < u < 1     uniformly blending value
       * u >= 1        blend value = bi_Components2
45     */
      double      u1, u2;
      /*
       * Pixels on current scan line within which u=0 and u=1 occurs.
```

- 27 -

```
        */
        int        p0, p1;
        BI_ScanLineBlendPoint *slbp;

5      u1 = bi->bi_BaseU + start_pixel*bi->bi_DuDx;
        u2 = bi->bi_BaseU + (end_pixel-1)*bi->bi_DuDx;

if (u1 <= 0.)
        {
10          if (u2 <= 0.)
            {
                /*
                 * Both u values are <= 0, so blend is uniform of value
                 * bi_Components1. Represent as start and end of run with same
15               * blend value.
                 */
                FILL2_COMPONENTS(blend_runs, 0, 1, bi->bi_Components1, bi);
                blend_runs[0].slbp_Pixel = start_pixel;
                blend_runs[1].slbp_Pixel = end_pixel;
20              return 1;
            }

/*
             * The given run of pixels on the current scan line crosses over from
             * where u < 0 to where u > 0. Find pixel within which u = 0.
25           */
            slbp = blend_runs;
            p0 = floor(0.5 - bi->bi_BaseU*bi->bi_DxDu);

/*
30           * Fill in blend segment of uniform value covering region where u <= 0.
             */
            FIRST_POINT(slbp, start_pixel,
                FILL_COMPONENTS(slbp, bi->bi_Components1, bi));
            NEXT_POINT(slbp, p0, FILL_COMPONENTS(slbp, bi->bi_Components1,
35      bi));

if (u2 < 1.)
            {
                /*
40               * The last pixel ends up somewhere where 0 < u < 1. The next blend
                 * segment will blend to the value interpolated at that pixel.
                 */
                NEXT_POINT(slbp, end_pixel, INTERP_COMPONENTS(slbp, u2, bi));
45          }
            else /*u2 >= 1.*/
            {
                /*
```

```
                                        - 28 -

* The last pixel ends up somewhere where u >= 1.
             * Work out pixel where u = 1 occurs.
             * Fill in a blend segment spanning 0 < u < 1 range,
             * and one covering region where u >= 1.
5            */
             p1 = floor(0.5 + (1. - bi->bi_BaseU)*bi->bi_DxDu);
             NEXT_POINT(slbp, p1, FILL_COMPONENTS(slbp, bi->bi_Components2,
         bi));
             NEXT_POINT(slbp, end_pixel,
10              FILL_COMPONENTS(slbp, bi->bi_Components2, bi));
           }
         }
         else if (u1 < 1.)
         {
15         /*
            * The run of pixels on the current scan line starts at a value to
            * be interpolated in the 0<u<1 range
            */
           slbp = blend_runs;
20         FIRST_POINT(slbp, start_pixel, INTERP_COMPONENTS(slbp, u1, bi));

if (u2 <= 0.)
           {
             /*
25            * The last pixel ends up somewhere where u <= 0.
              * Work out pixel where u = 0 occurs.
              * Fill in a blend segment spanning 0 < u < u1 range,
              * and one covering region where u <= 0.
              */
30           p0 = floor(0.5 - bi->bi_BaseU*bi->bi_DxDu);
             NEXT_POINT(slbp, p0, FILL_COMPONENTS(slbp, bi->bi_Components1,
         bi));
             NEXT_POINT(slbp, end_pixel,
                FILL_COMPONENTS(slbp, bi->bi_Components1, bi));
35         }
           else if (u2 < 1.)
           {
             /*
              * The entire range lies within 0 < u < 1. We need one blend
40            * segment that blend between the values interpolated at the first
              * and last pixels.
              */
             NEXT_POINT(slbp, end_pixel, INTERP_COMPONENTS(slbp, u2, bi));
           }
45         else /*u2 >= 1 */
           {
             /*
              * The last pixel ends up somewhere where u >= 1.
```

- 29 -

```
           * Work out pixel where u = 1 occurs.
           * Fill in a blend segment spanning u1 < u < 1 range,
           * and one covering region where u >= 1.
           */
 5         p1 = floor(0.5 + (1. - bi->bi_BaseU)*bi->bi_DxDu);
           NEXT_POINT(slbp, p1, FILL_COMPONENTS(slbp, bi->bi_Components2,
       bi));
           NEXT_POINT(slbp, end_pixel,
              FILL_COMPONENTS(slbp, bi->bi_Components2, bi));
10      }
      }
      else /*u1 >= 1.*/
      {
         if (u2 >= 1.)
15       {
            /*
             * Both u values are >= 1, so blend is uniform of value
             * bi_Components2. Represent as start and end of run with same
             * blend value.
20           */
            FILL2_COMPONENTS(blend_runs, 0, 1, bi->bi_Components2, bi);
            blend_runs[0].slbp_Pixel = start_pixel;
            blend_runs[1].slbp_Pixel = end_pixel;
            return 1;
25       }

/*
          * The given run of pixels on the current scan line crosses over from
          * where u > 1 to where u < 1. Find pixel in which u = 1 occurs.
30        */
         slbp = blend_runs;
         p1 = floor(0.5 + (1.- bi->bi_BaseU)*bi->bi_DxDu);

/*
35        * Fill in blend segment of uniform value covering
          * region where u <= 0.
          */
         FIRST_POINT(slbp, start_pixel,
             FILL_COMPONENTS(slbp, bi->bi_Components2, bi));
40       NEXT_POINT(slbp, p1, FILL_COMPONENTS(slbp, bi->bi_Components2,
       bi));

if (u2 > 0.)
         {
45          /*
             * The last pixel ends up somewhere where 0 < u < 1.
             * The next blend segment will blend to the value
             * interpolated at that pixel.
```

- 30 -

```
            */
           NEXT_POINT(slbp, end_pixel, INTERP_COMPONENTS(slbp, u2, bi));
        }
        else /*u2 <= 0.*/
        {
            /*
             * The last pixel ends up somewhere where u <= 0.
             * Work out pixel where u = 0 occurs.
             * Fill in a blend segment spanning 0 < u < 1 range,
             * and one covering region where u <= 0.
             */
            p0 = floor(0.5 - bi->bi_BaseU*bi->bi_DxDu);
            NEXT_POINT(slbp, p0, FILL_COMPONENTS(slbp, bi->bi_Components1,
bi));
            NEXT_POINT(slbp, end_pixel,
                FILL_COMPONENTS(slbp, bi->bi_Components1, bi));
        }
    } return slbp - blend_runs;
}

/*
 * merge_blends
 *
 * Given two sequences, each of two or more scan line blend points, that cover
 * the same range of pixels but have different components filled in, combine
 * them into a single sequence of scan line blend points in which all
 * components are evaluated at all points, by interpolating one set of
 * components at points where the other set of components is known.
 *
 * Parameters
 * blend_runs      Array where output is written.
 * runs1, runs2    Input arrays of blend points.
 * start1, num1, start2, num2
 *                 Define which components are used in input arrays.
 * num_segs1, num_segs2
 *                 Number of blend run segments in inputs.
 *
 * This routine returns the resultant number of blend run segments.
 */
static int
merge_blends
(
    BI_ScanLineBlendPoint *blend_runs,
    BI_ScanLineBlendPoint *runs1,
    int           start1,
```

```
            int         num1,
            int         num_segs1,
            BI_ScanLineBlendPoint *runs2,
            int         start2,
5           int         num2,
            int         num_segs2
        )
        {
            BI_ScanLineBlendPoint *slbp;
10          int         finish;
            int         i, n;
            double      r;

ASSERT(blend_runs != NULL && runs1 != NULL && runs2 != NULL,
15          "NULL");
            ASSERT(num_segs1 > 0 && num_segs2 > 0, "out of range");
            ASSERT(runs1[0].slbp_Pixel == runs2[0].slbp_Pixel, "bad start point");
            ASSERT
            (
20              runs1[num_segs1].slbp_Pixel == runs2[num_segs2].slbp_Pixel,
                "bad end point"
            );

slbp = blend_runs;
25          finish = runs1[num_segs1].slbp_Pixel;

for (;;)
            {
                if (runs1->slbp_Pixel < runs2->slbp_Pixel)
30              {
                    /*
                     * Current run 1 ends before current run 2.
                     * Make a blend point at end of run1,
                     * with run 1's components copied
35                   * and run 2's components interpolated at this point.
                     */
                    slbp->slbp_Pixel = runs1->slbp_Pixel;
                    for (i = start1, n = num1; n; ++i, --n)
                        slbp->slbp_CO[i] = runs1->slbp_CO[i];
40                  r = (runs1->slbp_Pixel - (runs2-1)->slbp_Pixel);
                    r /= (runs2->slbp_Pixel - (runs2-1)->slbp_Pixel);
                    for (i = start2, n = num2; n; ++i, --n)
                        slbp->slbp_CO[i] =
                            (runs2-1)->slbp_CO[i]
45                          +
                            r*(runs2->slbp_CO[i] - (runs2-1)->slbp_CO[i]);
                    ++runs1;
                }
```

- 32 -

```
        else if (runs1->slbp_Pixel > runs2->slbp_Pixel)
        {
            /*
             * Current run2 ends before current run1.
             * Make a blend point at end of run2,
             * with run2's components copied
             * and run1's components interpolated at this point.
             */
            slbp->slbp_Pixel = runs2->slbp_Pixel;
            for (i = start2, n = num2; n; ++i, --n)
                slbp->slbp_CO[i] = runs2->slbp_CO[i];
            r = (runs2->slbp_Pixel - (runs1-1)->slbp_Pixel);
            r /= (runs1->slbp_Pixel - (runs1-1)->slbp_Pixel);
            for (i = start1, n = num1; n; ++i, --n)
                slbp->slbp_CO[i] =
                    (runs1-1)->slbp_CO[i]
                    +
                    r*(runs1->slbp_CO[i] - (runs1-1)->slbp_CO[i]);
            ++runs2;
        }
        else /*equal*/
        {
            slbp->slbp_Pixel = runs1->slbp_Pixel;
            for (i = start1, n = num1; n; ++i, --n)
                slbp->slbp_CO[i] = runs1->slbp_CO[i];
            for (i = start2, n = num2; n; ++i, --n)
                slbp->slbp_CO[i] = runs2->slbp_CO[i];
            if (runs1->slbp_Pixel == finish)
                break;
            ++runs1; ++runs2;
        }
        ++slbp:
    }

ASSERT(runs1->slbp_Pixel == finish && runs2->slbp_Pixel == finish,
"@#!");

return slbp - blend_runs;
}

/* EXTERN
 * BI_interpolate_blend - interpolate blend on current scan line
 *
 * This function is called to interpolate a blend on the current scan line.
 * It fills the "blend_runs" array with a sequence of two or more blend points
 * that define a piece-wise linear colour/opacity blend along the scan line.
 * This function may be called any number of times for the current scan line.
```

- 33 -

```
 *
 * Parameters
 * blender       A pointer to a "blender" that interpolates a colour
 *               and/or opacity blend.
 * blend_runs    An array of structures filled by this routine with the
 *               interpolated blend for the given run of pixels.
 *               Must have length BI_MAX_NUM_BLEND_POINTS.
 * start_pixel   The first pixel of the range of pixels within which
 *               the blend is interpolated.
 * run_length    The number of pixels in the range of pixels within which
 *               the blend is interpolated.
 *
 * Return value
 * The number of piece-wise linear segments generated, which is one less than
 * the number of blend points filled in.
 */
int
BI_interpolate_blend
(
    BI_Blender      *blender,
    BI_ScanLineBlendPoint *blend_runs,
    int             start_pixel,
    int             run_length
)
{
    ASSERT(blender != NULL,   "NULL pointer");
    ASSERT(blend_runs != NULL, "NULL pointer");
    ASSERT(run_length > 0,    "argument out of range");

switch (blender->b_BlendType)
    {
      case BI_NO_RGB_INDET_O:
        return
            indeterminate_blend
            (
                blend_runs,
                &blender->b_Opacity,
                start_pixel, start_pixel+run_length
            );

case BI_NO_RGB_INDEPX_O:
        return
            independent_of_x_blend
            (
                blend_runs,
                &blender->b_Opacity,
                start_pixel, start_pixel+run_length
            );
```

- 34 -

```
case BI_NO_RGB_GENERAL_O:
  return
    general_blend
      (
        blend_runs,
        &blender->b_Opacity,
        start_pixel, start_pixel+run_length
      );

case BI_INDET_RGB_NO_O:
case BI_PARAM_EQUIV_INDET:
  return
    indeterminate_blend
      (
        blend_runs,
        &blender->b_Colour,
        start_pixel, start_pixel+run_length
      );

case BI_INDET_RGB_INDET_O:
  return
    other_blend_indeterminate
      (
        blend_runs,
        &blender->b_Opacity,
        indeterminate_blend
          (
            blend_runs,
            &blender->b_Colour,
            start_pixel, start_pixel+run_length
          )
      );

case BI_INDET_RGB_INDEPX_O:
  return
    other_blend_independent_of_x
      (
        blend_runs,
        &blender->b_Opacity,
        indeterminate_blend
          (
            blend_runs,
            &blender->b_Colour,
            start_pixel, start_pixel+run_length
          )
      );
```

```
                                            - 35 - case BI_INDET_RGB_GENERAL_O:
           return
               other_blend_indeterminate
               (
 5                 blend_runs.
                   &blender->b_Colour,
                   general_blend
                   (
                       blend_runs,
10                     &blender->b_Opacity,
                       start_pixel, start_pixel+run_length
                   )
               );

15         case BI_INDEPX_RGB_NO_O:
           case BI_PARAM_EQUIV_INDEPX:
           return
               independent_of_x_blend
               (
20                 blend_runs,
                   &blender->b_Colour,
                   start_pixel, start_pixel+run_length
               );

25         case BI_INDEPX_RGB_INDET_O:
           return
               other_blend_indeterminate
               (
                   blend_runs,
30                 &blender->b_Opacity,
                   independent_of_x_blend
                   (
                       blend_runs,
                       &blender->b_Colour,
35                     start_pixel, start_pixel+run_length
                   )
               );

case BI_INDEPX_RGB_INDEPX_O:
40         return
               other_blend_independent_of_x
               (
                   blend_runs,
                   &blender->b_Opacity,
45                 independent_of_x_blend
                   (
                       blend_runs,
                       &blender->b_Colour,
```

- 36 -

```
                    start_pixel, start_pixel+run_length
                )
            );

case BI_INDEPX_RGB_GENERAL_O:
        return
            other_blend_independent_of_x
            (
                blend_runs,
                &blender->b_Colour,
                general_blend
                (
                    blend_runs,
                    &blender->b_Opacity,
                    start_pixel, start_pixel+run_length
                )
            );

case BI_GENERAL_RGB_NO_O:
    case BI_PARAM_EQUIV_GENERAL:
        return
            general_blend
            (
                blend_runs,
                &blender->b_Colour,
                start_pixel, start_pixel+run_length
            );

case BI_GENERAL_RGB_INDET_O:
        return
            other_blend_indeterminate
            (
                blend_runs,
                &blender->b_Opacity,
                general_blend
                (
                    blend_runs,
                    &blender->b_Colour,
                    start_pixel, start_pixel+run_length
                )
            );

case BI_GENERAL_RGB_INDEPX_O:
        return
            other_blend_independent_of_x
            (
                blend_runs,
                &blender->b_Opacity,
```

```
                    general_blend
                    (
                        blend_runs,
                        &blender->b_Colour,
 5                      start_pixel, start_pixel+run_length
                    )
                );

case BI_GENERAL_RGB_GENERAL_O:
10              {
                    BI_ScanLineBlendPoint colour_runs[BI_MAX_NUM_BLEND_POINTS];
                    BI_ScanLineBlendPoint opacity_runs[BI_MAX_NUM_BLEND_POINTS];

return
15                     merge_blends
                       (
                           blend_runs,
                           colour_runs,
                           blender->b_Colour.bi_StartComponent,
20                         blender->b_Colour.bi_NumComponents,
                           general_blend
                           (
                               colour_runs,
                               &blender->b_Colour,
25                             start_pixel, start_pixel+run_length
                           ),
                           opacity_runs,
                           blender->b_Opacity.bi_StartComponent,
                           blender->b_Opacity.bi_NumComponents,
30                         general_blend
                           (
                               opacity_runs,
                               &blender->b_Opacity,
                               start_pixel, start_pixel+run_length
35                         )
                       );
                } default:
40              ASSERT(0, "invalid blend type");
            }
            /*NOTREACHED*/
            return 0; /* Keep various compilers happy */
        }
45      _____

/*
```

- 38 -

```
 * $RCSfile: bi-next.c,v $ -- Advance interpolation of colour/opacity blend to next scan
 line
 *
 * $Author: george $    $Date: 1994/06/21 03:12:40 $
 *
 *
 * Copyright (C) 1994. Canon Information Systems Research Australia.
 *    All rights reserved.
 *
 *
 * Who is the current $Locker:  $
 *
 * CHANGE HISTORY:
 * --------------
 *
 * $Log: bi-next.c,v $
 * Revision 1.2  1994/06/21  03:12:40  george
 * Comment changes to allow automatic manual entry generation.
 *
 * Revision 1.1  1994/06/06  01:21:05  george
 * Initial revision
 *
 * ===
 */ include <defs.h>
include <bi.h>
include <bi-blender.h> static char what_id[] = "@(#) bi/$Id: bi-next.c,v 1.2 1994/06/21 03:12:40 george Exp
$"; UNUSED(what_id);

/* EXTERN
 * BI_next_scan_line - advance blend interpolation to next scan line
 *
 * This function sets up blend interpolation for the next scan line.
 * Calls to "BI_interpolate_blend" will hence apply to the next scan line.
 *
 * Parameters
 * blender          A pointer to a "blender" that interpolates a
 *                  colour/opacity blend, as created by "BI_init_blender".
 */
void
BI_next_scan_line(BI_Blender *blender)
{
    ASSERT(blender != NULL, "NULL pointer passed");
```

- 39 -

```
    switch (blender->b_BlendType)
    {
      case BI_INDET_RGB_NO_O:
      case BI_PARAM_EQUIV_INDET:
 5      ++blender->b_Colour.bi_RelY;
        break;

case BI_NO_RGB_INDET_O:
        ++blender->b_Opacity.bi_RelY;
10      break;

case BI_INDEPX_RGB_NO_O:
      case BI_GENERAL_RGB_NO_O:
      case BI_PARAM_EQUIV_INDEPX:
15    case BI_PARAM_EQUIV_GENERAL:
        blender->b_Colour.bi_BaseU += blender->b_Colour.bi_DuDy;
        break;

case BI_NO_RGB_INDEPX_O:
20    case BI_NO_RGB_GENERAL_O:
        blender->b_Opacity.bi_BaseU += blender->b_Opacity.bi_DuDy;
        break;

case BI_INDEPX_RGB_INDET_O:
25    case BI_GENERAL_RGB_INDET_O:
        blender->b_Colour.bi_BaseU += blender->b_Colour.bi_DuDy;
        ++blender->b_Opacity.bi_RelY;
        break;

30    case BI_INDET_RGB_INDEPX_O:
      case BI_INDET_RGB_GENERAL_O:
        ++blender->b_Colour.bi_RelY;
        blender->b_Opacity.bi_BaseU += blender->b_Opacity.bi_DuDy;
        break;
35
      case BI_INDET_RGB_INDET_O:
        ++blender->b_Colour.bi_RelY;
        ++blender->b_Opacity.bi_RelY;
        break;
40
      case BI_INDEPX_RGB_INDEPX_O:
      case BI_INDEPX_RGB_GENERAL_O:
      case BI_GENERAL_RGB_INDEPX_O:
      case BI_GENERAL_RGB_GENERAL_O:
45      blender->b_Colour.bi_BaseU += blender->b_Colour.bi_DuDy;
        blender->b_Opacity.bi_BaseU += blender->b_Opacity.bi_DuDy;
        break;
```

- 40 -

```
    default:
      ASSERT(0, "invalid blend type");
  }
}
```

The claims defining the invention are as follows:

1. A method of determining a color blend of a computer graphical object, said method comprising the steps of:
   providing a plurality of interactive control points, each of said control points having an associated color value; and
   calculating a color value of each portion of said graphical object dependent on its relative position to said control points, with said calculated color value being clipped at a boundary of the graphical object.

2. The method according to claim 1, wherein:
   the number of said control points is two; and
   portions of said graphical object having a projection outside a line taken between the two control points are determined to have a color substantially the same as the closest one of said control points.

3. The method according to claim 1, wherein the position, or associated color value, or both, of each of said control points can be interactively altered.

4. The method according to claim 3, further comprising the step of recalculating said color values of each portion of said graphical object when said control points are altered.

5. The method according to claim 1, wherein said color blend comprises an opacity blend where each of said control points has an associated opacity value.

6. An apparatus for determining a color blend of a computer graphical object, said apparatus comprising:
   means for providing a plurality of interactive control points, each of said control points having an associated color value; and
   means for calculating a color value of each portion of said graphical object dependent on its relative position to said control points, with said calculated color value being clipped at a boundary of the graphical object.

7. The apparatus according to claim 6, wherein the number of said control points is two; and said apparatus further comprises means for determining the color of portions of said graphical object having a projection outside a line extending between the two control points whereby the color of each portion is assigned to be substantially the same as that of the closest one of said control points.

8. The method according to claim 6 wherein the position, or associated color value, or both, of each of said control points can be interactively altered.

9. The apparatus according to claim 8, further comprising means for recalculating said color values of each portion of said graphical object when said control points are altered.

10. The apparatus according to claim 6, wherein said color blend comprises an opacity blend where each of said control points has an associated opacity value.

11. A method for controlling a color blend of a graphical object, said graphical object being displayed as part of a computer-generated image on display means and said image comprising a first predetermined number of pixels, wherein said image is stored in memory coupled to a processing means, said graphical object having a second predetermined number of pixels less than or equal to said first predetermined number of pixels, said method comprising the steps of:
   providing at least two control points for controlling said color blend of said graphical object, wherein said control points are capable of being interactively manipulated by a user and each control point has a corresponding color;
   altering the position of at least one of said control points, wherein said color blend is dependent on said control points;
   calculating a color value of each one of the second predetermined number of pixels of said graphical object dependent on the altered position of said at least one of said control points, with said calculated color value being clipped at a boundary of the graphical object, and
   displaying said calculated colors of said second predetermined number of pixels to provide a modified color blend of said graphical object.

12. The method of claim 11, further comprising the step of storing said color and said position of each of said control points as part of said graphical object stored in said memory.

13. The method of claim 11, wherein said at least two control points define a line extending between said control points within said graphical object.

14. The method of claim 13, wherein said calculating step comprises the following steps which are carried out for each pixel of said second predetermined number of pixels:
   determining if a projection of said pixel intersects with said line;
   when said pixel does intersect with said line, said color of said pixel is specified to be a color dependent on said intersect with said color blend between said at least two control points;
   otherwise, said color of said pixel is specified to be a color dependent on the color of the nearest one of the at least two control points.

15. The method according to claim 11, wherein said color blend comprises an opacity blend where each of said control points has an associated opacity value.

16. An apparatus for controlling a color blend of a graphical object, said graphical object being displayed as part of a computer-generated image on a display means, wherein said image is stored in memory coupled to a processing means, said image having a first predetermined number of pixels and said graphical object having a second number of pixels less than or equal to said first number of pixels, said apparatus comprising:
   means for providing at least two control points for controlling said color blend of said graphical object, wherein said control points are capable of being interactively manipulated by a user and each control point has a corresponding color;
   means for altering the position of at least one of said control points, wherein said color blend is dependent on said control points;
   means for calculating a color value of each one of the second predetermined number of pixels of said graphical object dependent on the altered position of said at least one of said control points, with said calculated color value being clipped at a boundary of the graphical object,
   wherein said calculated colors of said second predetermined number of pixels are displayed on said display means to provide a modified color blend of said graphical object.

17. The apparatus of claim 16, further comprising means for storing said color and said position of each of said control points as part of said graphical object stored in said memory.

18. The apparatus of claim 16, wherein said at least two control points define a line extending between said control points within said graphical object.

19. The apparatus of claim 18, wherein said calculating means operates on each pixel of said second predetermined number of pixels and further comprises:

means for determining if a projection of said pixel intersects with said line;

means for specifying said color of said pixel to be a color dependent on said intersect with said color blend between said at least two control points when said pixel does intersect with said line and for specifying said color of said pixel to be the color of the nearest one of the at least two control points otherwise.

20. The apparatus according to claim 19, wherein said color blend comprises an opacity blend where each of said control points has an associated opacity value.

21. A computer program product comprising a computer usable medium having computer readable program code means embodied in said medium for determining a color blend of a computer graphical object, said product including:

codes for providing a plurality of interactive control points, each of said control points having an associated color value; and codes for calculating a color value of each portion of said graphical object dependent on its relative position to said control points, with said calculated color value being clipped at a boundary of the graphical object.

22. A computer program product comprising a computer usable medium having computer readable program code means embodied in said medium for controlling a color blend of a graphical object, said graphical object being displayed as part of a computer-generated image on display means and said image comprising a first determined number of pixels, wherein said image is stored in a memory coupled to a processing means, said graphical object having a second predetermined number of pixels less than or equal to said first predetermined number of pixels, said product including:

codes for providing at least two control points for controlling said color blend of said graphical object, wherein said control points are capable of being interactively manipulated by a user and each control point has a corresponding color;

codes for altering the position of at least one of said control points, wherein said color blend is dependent on said control points;

codes for calculating a color value of each one of said second predetermined number of pixels of said graphical object dependent on the altered position of said at least one of said control points, with said calculated color value being clipped at a boundary of the graphical object; and codes for displaying said calculated colors of said second predetermined number of pixels to provide a modified color blend of said graphical object.

23. A method of determining a color blend of a computer graphical object, said method comprising the steps of:

providing a plurality of interactive control points, each of said control points having an associated color value;

calculating a first color value of each portion of said graphical object inside an area defined by the control points, said first color value being dependent on a relative position to said control points; and determining a second color value of each portion of said graphical object outside the area defined by the control points, said second color value being substantially the same color value as the closest one of said control points, said calculated color value being clipped at a boundary of the graphical object.

24. An apparatus for determining a color blend of a computer graphical object, said apparatus comprising:

means for providing a plurality of interactive control points, each of said control points having an associated color value;

means for calculating a first color value of each portion of said graphical object inside an area defined by the control points, said first color value being dependent on a relative position to said control points; and means for determining a second color value for each portion of said graphical object outside the area defined by the control points, said second color value being substantially the same color value as the closest one of said control points, with said calculated color value being clipped at a boundary of the graphical object.

25. A method for controlling a color blend of a graphical object, said graphical object being displayed as part of a computer-generated image on display means and said image comprising a first predetermined number of pixels, wherein said image is stored in a memory coupled to a processing means, said graphical object having a second predetermined number of pixels less than or equal to said first predetermined number of pixels, said method comprising the steps of:

providing at least two control points for controlling said color blend of said graphical object wherein said control points are capable of being interactively manipulated by a user and each control point has a corresponding color;

altering the position of at least one of said control points, wherein said color blend is dependent on said control points;

calculating a color of each one of the second predetermined number of pixels of said graphical object dependent on the altered position of said at least one of said control points, whereby a first color value of a first set of the second predetermined number of pixels inside an area defined by the control points is dependent on a relative position to said control points, and a second color value of a second set of the second predetermined number of pixels outside the area defined by the control points is substantially the same as the closest one of said control points, with said calculated color value being clipped at a boundary of the graphical object; and displaying said calculated colors of said second predetermined number of pixels to provide a modified color blend of said graphical object.

26. An apparatus for controlling a color blend of a graphical object, said graphical object being displayed as part of a computer-generated image on a display means, wherein said image is stored in memory coupled to a processing means, said image having a first predetermined number of pixels and said graphical object having a second number of pixels less than or equal to said first number of pixels, said apparatus comprising:

means for providing at least two control points for controlling said color blend of said graphical object, wherein said control points are capable of being interactively manipulated by a user and each control point has a corresponding color;

means for altering the position of at least one of said control points, wherein said color blend is dependent on said control points;

means for calculating a color of each one of the second predetermined number of pixels of said graphical object dependent on the altered position of said at least one of said control points, wherein a first color value of a first set of the second predetermined number of pixels inside an area defined by the control points is dependent on a relative position to said control points, and a second color value of a second set of the second predetermined number of pixels outside the area defined by the control points is substantially the same as the closest one of said control points, said calculated color value being clipped at a boundary of the graphical object; and wherein said calculated colors of said second predetermined number of pixels are displayed on said display means to provide a modified color blend of said graphical object.

27. A computer program product comprising a computer usable medium having computer readable program code means embodied in said medium for determining a color blend of a computer graphical object, said product including:

codes for providing a plurality of interactive control points, each of said control points having an associated color value;

codes for calculating a first color value of a portion of said graphical object inside an area defined by the control points, said first color value being dependent on a relative position to said control points, with said calculated color value being clipped at a boundary of the graphical object; and codes for determining a second color value of each portion of said graphical object outside the area defined by the control points, said second color value being substantially the same color value as the closest one of said control points.

28. A computer program product comprising a computer usable medium having computer readable program code means embodied in said medium for controlling a color blend of a graphical object, said graphical object being displayed as part of a computer-generated image on a display means and said image comprising a first predetermined number of pixels, wherein said image is stored in a memory coupled to a processing means, said graphical object having a second predetermined number of pixels less than or equal to said first predetermined number of pixels, said product including;

codes for providing at least two control points for controlling said color blend of said graphical object, wherein said control points are capable of being interactively manipulated by a user and each control point has a corresponding color;

codes for altering the position of at least one of said control points, wherein said color blend is dependent on said control points;

codes for calculating the color of each one of said second predetermined number of pixels of said graphical object dependent on the altered position of said at least one of said control points, whereby a first color value of a first set of the second predetermined number of pixels inside an area defined by the control points is dependent on a relative position to said control points, and a second color value of a second set of the second predetermined number of pixels outside the area defined by the control points is substantially the same as the closest one of said control points, with said calculated color value being clipped at a boundary of the graphical object; and codes for displaying said calculated colors of said second predetermined number of pixels to provide a modified color blend of said graphical object.

29. A method for controlling a color blend of a computer graphical object, said method comprising the steps of:

providing a plurality of interactive control points, each of said control points having an associated color value;

calculating a color value of each portion of said graphical object dependent on relative position to said control points;

altering the position of at least one of said control points, wherein said color blend is dependent on said control points; and calculating a modified color value of each portion of said graphical object dependent on relative position to said altered control points.

30. An apparatus for controlling a color blend of a computer graphical object, said apparatus comprising:

means for providing a plurality of interactive control points, each of said control points having an associated color value;

means for calculating a color value of each portion of said graphical object dependent on relative position to said control points;

means for altering the position of at least one of said control points, wherein said color blend is dependent on said control points; and means for calculating a modified color value of each portion of said graphical object dependent on relative position to said altered control points.

31. A computer program product comprising a computer usable medium having computer readable program code means embodied in said medium for controlling a color blend of a computer graphical object, said product including:

codes for providing a plurality of interactive control points, each of said control points having an associated color value;

codes for calculating a color value of each portion of said graphical object dependent on relative position to said control points;

codes for altering the position of at least one of said control points, wherein said color blend is dependent on said control points; and codes for calculating a modified color value of each portion of said graphical object dependent on relative position to said altered control points.

* * * * *

UNITED STATES PATENT AND TRADEMARK OFFICE
CERTIFICATE OF CORRECTION

PATENT NO. : 6,002,408

DATED : December 14, 1999

INVENTOR(S): TIMOTHY M. LONG

It is certified that error appears in the above-identified patent and that said Letters Patent is hereby corrected as shown below:

[57] ABSTRACT:

Line 14, "points (5,6)." should read --points.--.

COLUMN 4:

Line 30, "point S" should read --point 5--.

COLUMN 7:

Line 37, "FIG." should read --FIG. 6.--.

Signed and Sealed this

Tenth Day of April, 2001

Attest:

NICHOLAS P. GODICI

Attesting Officer        Acting Director of the United States Patent and Trademark Office